Oct. 7, 1924.  
W. B. QUILLEN  
GRADER  
Filed July 11, 1923  
1,510,958
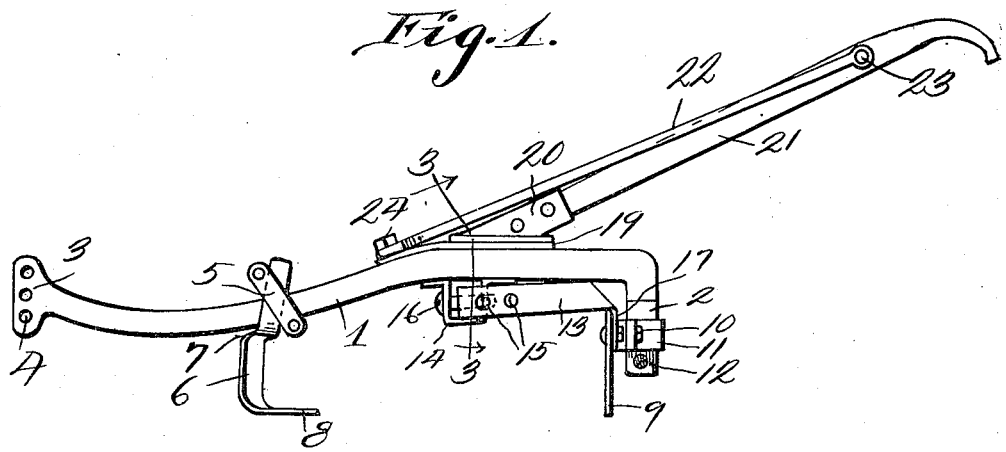
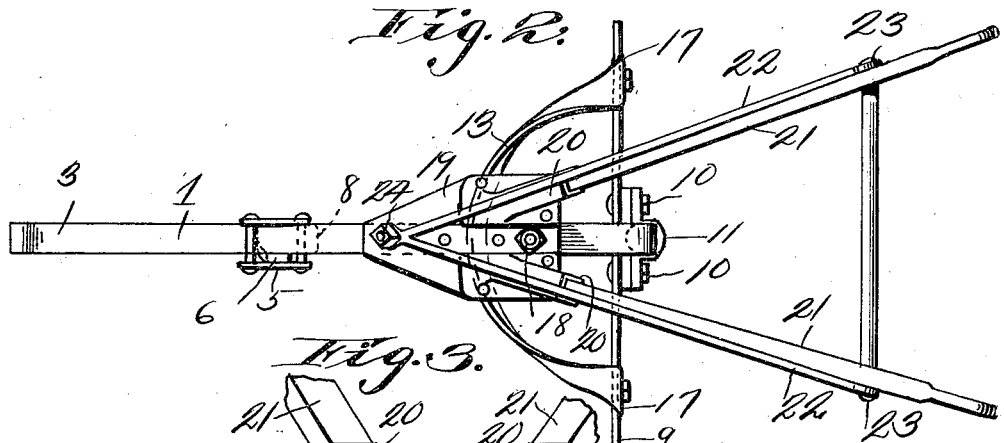
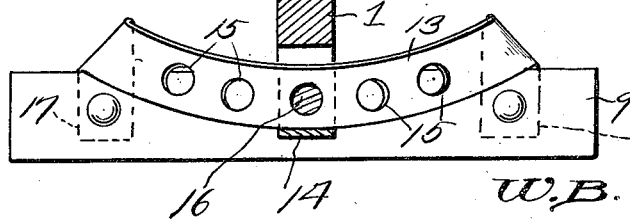
Inventor  
W. B. Quillen  
By D. Swift  
Attorney Patented Oct. 7, 1924.

1,510,958

UNITED STATES PATENT OFFICE.

WILLIAM BARTON QUILLEN, OF FALL RIVER MILLS, CALIFORNIA.

GRADER.

Application filed July 11, 1923. Serial No. 650,859.

*To all whom it may concern:*

Be it known that I, WILLIAM B. QUILLEN, a citizen of the United States, residing at Fall River Mills, in the county of Shasta, State of California, have invented a new and useful Grader; and I do hereby declare the following to be a full, clear, and exact description of the invention, such as will enable others skilled in the art to which it appertains to make and use the same.

The invention relates to graders, and has for its object to provide a device of this character comprising a beam having its rear end provided with a downwardly extending arm, on which arm a transversely disposed scraper is pivotally mounted. The scraper is provided with a horizontally disposed segmentally shaped member, which extends through a bolt carrying bracket, the bolt of which may be passed through any of the apertures in the segmentally shaped member and the bolt carrying member for holding the scraper at various angles transversely.

A further object is to provide the beam with rearwardly extending handle members whereby the device may be guided and controlled by an operator when a draft animal is hitched to the forward end of the beam.

A further object is to provide the beam adjacent its forward end with a supporting ground engaging member adapted to slide over the ground forwardly of the scraper.

A further object is to provide a road grader having a transversely disposed scraping member, which member may be adjusted at various angles in a horizontal plane for discharging the scraped material to either side of the device.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the scraper.

Figure 2 is a top plan view.

Figure 3 is a transverse sectional view taken on line 3—3 of Figure 1.

Referring to the drawing, the numeral 1 designates the beam of the grader and 2 a downwardly extending cylindrical arm at the rear end thereof. The forward end 3 of the beam 1 is provided with a clevis 4 to which a draft animal may be attached for dragging the device over the ground. Adjustably secured to the beam 1 by means of a clamping device 5 is a downwardly extending ground engaging supporting arm 6, which arm is bent to form a shoulder 7 disposed beneath the beam 1 for limiting the upward movement of the arm 6, and with a rearwardly extending horizontally disposed portion 8 adapted to engage and slide over the ground forwardly of the scraper blade 9, thereby supporting the beam at a substantial uniform distance from the ground. Secured to the rear side of the scraper blade 9 by means of bolts 10 is a bearing member 11, in which the downwardly extending arm 2 is mounted, in a manner whereby the scraper blade 9 may be adjusted to various angles transversely when so desired, however the bearing member 11 is prevented from coming off the arm 2 by means of a pin 12, which extends through the arm 2 below the bearing member 11. Secured to the transversely disposed scraper blade 9 is a segmentally shaped apertured member 13, which member extends through a U-shaped bracket 14 and is adapted to receive in any of its apertures 15 a bolt 16 carried by the bracket 14 for holding the segmentally shaped member 13 against movement after it is adjusted to a desired position for a scraping operation. The ends of the segmentally shaped member 13 are bent downwardly, thereby forming ears 17, which are secured to the rear side of the scraper blade 9, therefore it will be seen that the scraper blade 9 may be adjusted to various positions in a horizontal plane for a scraping operation, and particularly for moving or discharging the scraped material to the right or left of the scraper. Secured to the upper side of the beam 1 by means of a bolt 18 is a plate 19, which plate is provided with rearwardly and upwardly extending diverging sockets 20, in which the diverging handle members 21 are secured, thereby forming means whereby the operator may walk behind the scraper and guide the same as it moves forwardly during a scraping operation, and at the same time control the draft animals. To brace the handle members 21, a V-shaped brace member 22 is provided, which member has the rear ends of its arms secured at 23 to the sides of the handle members 21 and adjacent the point where they merge together the V-shaped member is secured to the plate 19 by means of a bolt 24, therefore it will be seen that the handle members are thoroughly braced at all times.

From the above it will be seen that a ground scraping machine is provided which is simple in construction, may be easily handled and one wherein a transversely disposed scraper blade may be adjusted to various angles for discharging scraped material to either side of the device.

The invention having been set forth what is claimed as new and useful is:—

The combination with a ground scraping device comprising a beam, means for supporting the forward end of said beam, handle members extending rearwardly from the beam, of a scraper, said scraper being movable to various angles in a horizontal plane, a rearwardly extending bracket carried by the rear side of said scraper, a downwardly extending arm carried by the rear end of the beam rearwardly of the scraper and on which the scraper bracket is pivotally mounted, a segmentally shaped horizontally disposed apertured brace member carried by the scraper, the ends of said brace member being secured to the rear side of the scraper, said brace member extending loosely through a U-shaped bracket carried by the under side of the beam, a horizontally disposed bolt carried by the last named bracket and extending through the opposite walls of the U-shaped member and cooperating with the apertured segmentally shaped brace member for holding said brace member in various adjusted positions.

In testimony whereof I have signed my name to this specification in the presence of two subscribing witnesses.

WILLIAM BARTON QUILLEN.

Witnesses:
   Geo. H. Taylor,
   Katherine T. Taylor.